United States Patent
Yen (10) Patent No.: US 7,796,201 B2
(45) Date of Patent: Sep. 14, 2010

(54) PIXEL DEVICE HAVING A CAPACITOR COMPRISING METAL LAYERS AND A CAPACITOR HAVING POLY-SILICON LAYERS

(75) Inventor: Cheng-Chi Yen, Tainan County (TW)

(73) Assignee: Himax Display, Inc., Tainan County (TW)

( * ) Notice: Subject to any disclaimer, the term of this patent is extended or adjusted under 35 U.S.C. 154(b) by 155 days.

(21) Appl. No.: 12/049,597

(22) Filed: Mar. 17, 2008

(65) Prior Publication Data
US 2009/0231503 A1 Sep. 17, 2009

(51) Int. Cl.
*G02F 1/1343* (2006.01)
(52) U.S. Cl. .............. 349/38; 349/39; 349/140
(58) Field of Classification Search ........... 349/38, 349/39, 140
See application file for complete search history.

(56) References Cited

U.S. PATENT DOCUMENTS

| | | | |
|---|---|---|---|
| 4,870,396 A | 9/1989 | Shields | |
| 6,437,839 B1* | 8/2002 | Cacharelis | 349/39 |
| 2002/0018152 A1* | 2/2002 | Nagata et al. | 349/38 |
| 2006/0007192 A1 | 1/2006 | De Smet et al. | |
| 2006/0215068 A1* | 9/2006 | Nakagawa | 349/38 |

* cited by examiner

*Primary Examiner*—Andrew Schechter
*Assistant Examiner*—Michael Inadomi
(74) *Attorney, Agent, or Firm*—J.C. Patents (57) ABSTRACT

A pixel device capable of composing a panel is provided herein. The pixel device includes a first switch, a first capacitor, and a second capacitor. The first switch delivers a pixel signal to a pixel electrode according to a control signal. The first capacitor has a first part of a first metal layer, a second metal layer, and a first dielectric coupled between the first part of the first metal layer and the second metal layer. The second capacitor has a first poly-silicon layer, an electrode layer, and a second dielectric coupled between the first poly-silicon layer and the electrode layer. The first and the second capacitors are parallel connected without increasing the area of the pixel and serve as a storage capacitor. Therefore, the pixel device can obtain more overall storage capacitance.

9 Claims, 9 Drawing Sheets

PIXEL DEVICE HAVING A CAPACITOR COMPRISING METAL LAYERS AND A CAPACITOR HAVING POLY-SILICON LAYERS

BACKGROUND OF THE INVENTION

1. Field of the Invention

The present invention relates to a pixel device, and more particularly, to utilize the layout technique to increase the capacitance of the storage capacitor included in the pixel.

2. Description of Related Art

Figure 1:
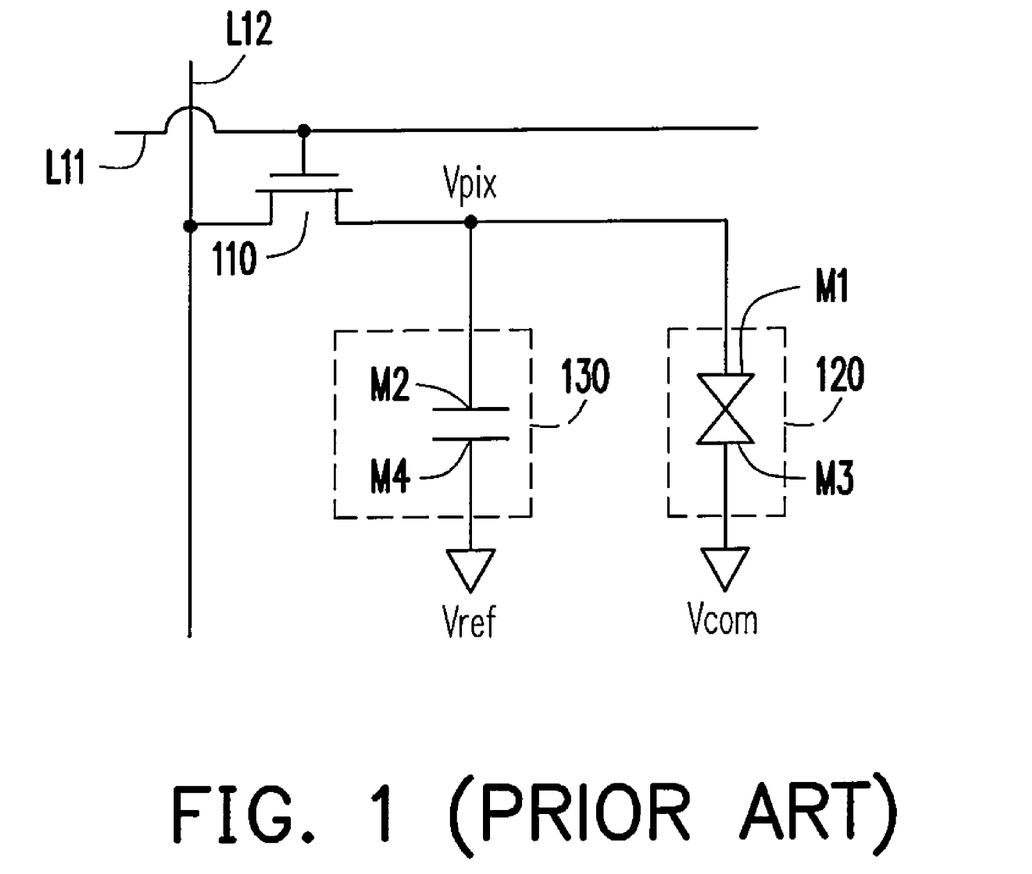
FIG. 1 is a circuit diagram of a conventional pixel device.

Because liquid crystal displays (LCDs) can be made thin, compact, and lightweight, the LCDs are becoming increasingly prevalent in high density projection-type display. The panel of the LCD is composed of a pixel matrix which comprising a plurality of pixel devices. FIG. 1 is a circuit diagram of a conventional pixel device. Referring to FIG. 1, each pixel device has a switch element 110, a storage capacitor 130, and a liquid crystal cell 120. The switch element 110, for example, a transistor which has a gate coupled to a scan line L11 for receiving a scan driving signal, a first source/drain coupled to a data line L12 for receiving a data driving signal, and a second source/drain coupled to an electrode M1 of the liquid crystal cell 120 and an electrode M2 of the storage capacitor 130. The other electrode M3 of the liquid crystal cell 120 and the other electrode M4 of the storage capacitor 130 are respectively coupled to a common voltage Vcom and a reference voltage Vref.

When the scan driving signal is asserted to conduct the switch element 110, the data driving signal with a pixel voltage Vpix can be applied to the liquid crystal cell 120 through the data line L12 and the liquid crystal cell 120 can be responded to the delivered data driving signal and thereby controls the rotation and the light transmission of the liquid crystal. Nevertheless, the applied pixel voltage would decrease between the two electrodes M1 and M3 of the liquid crystal cell 120 due to the leakage current. Hence, the storage capacitor 130 is used to maintain the voltage difference between two electrodes M1 and M3 of the liquid crystal cell 120 during a scan frame time.

Figure 2A:
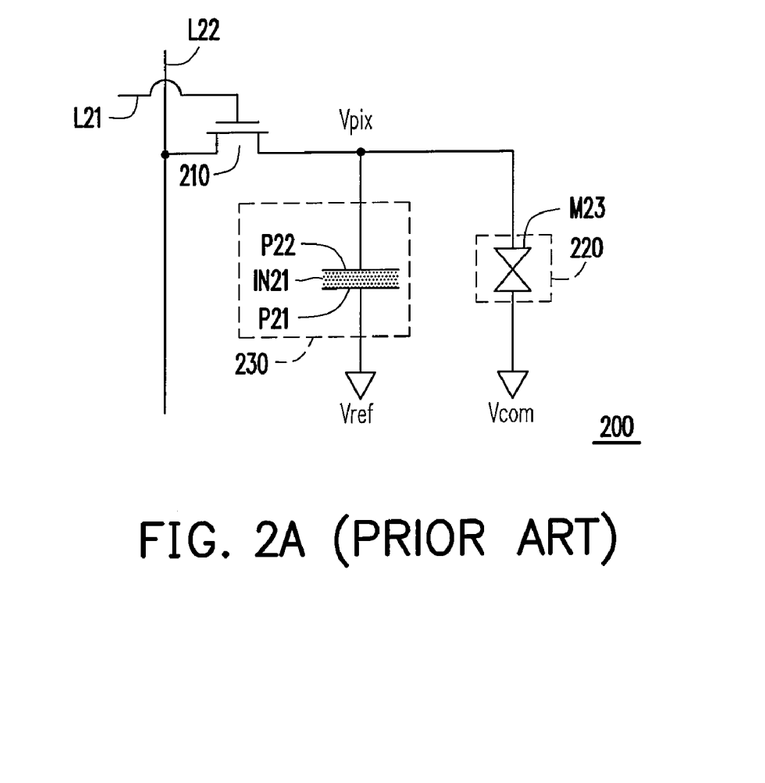
FIG. 2A is a circuit diagram of a pixel device.
Figure 2B:
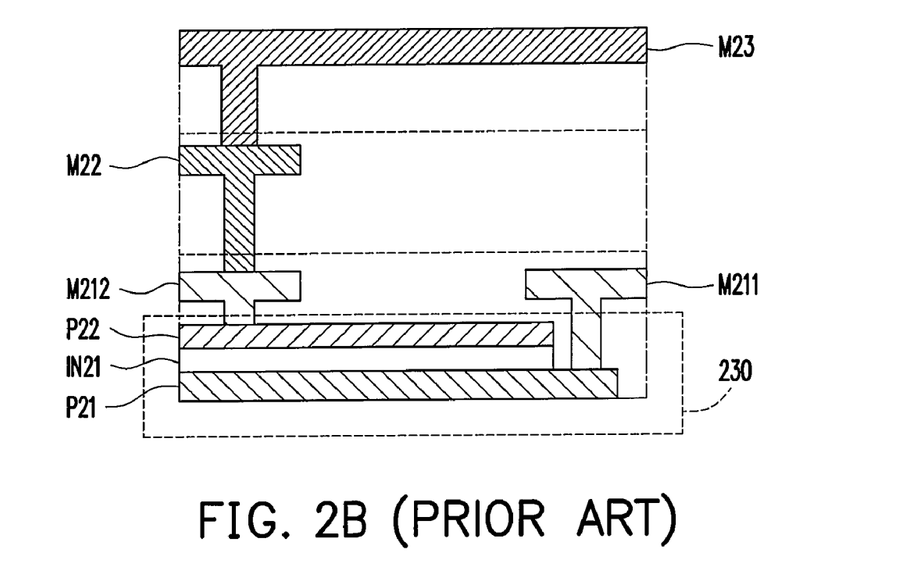
FIG. 2B is a layout structure diagram of the storage capacitor in FIG. 2A.

The storage capacitor 130 is an important component in the pixel device, and people previously mentioned there are three structures of the storage capacitor 130 according to the layout and process technique, that is, poly-insulator-poly (PIP) structure, metal-insulator-metal (MIM) structure, and metal-oxide-silicon (MOS) structure. FIG. 2A is a circuit diagram of a pixel device. Referring to FIG. 2A, the pixel device 200 includes a switch element 210, a liquid crystal cell 220 and a storage capacitor 230 with PIP structure. The connections between the switch element 210, the liquid crystal cell 220, and the storage capacitor 230 are the same as FIG. 1. FIG. 2B is a layout structure diagram of the storage capacitor 230 in FIG. 2A. Referring to FIG. 2A and FIG. 2B, the electrodes P21 and P22 of the storage capacitor 230 are respectively made by a first poly-silicon layer and a second poly-silicon layer, wherein an insulator IN21 is coupled between the electrodes P21 and P22. Referring to FIG. 2B, the electrode P21 made by the first poly-silicon layer is coupled to an electrode M211 made by a first part of a first metal layer, wherein the reference voltage Vref is provided to the electrode M211. The electrode P22 made by the second poly-silicon layer is coupled to an electrode M212 made by a second part of the first metal layer, wherein the pixel voltage Vpix is provided to the electrode M212. The pixel structure as shown in FIG. 2A and FIG. 2B is capable of applying to an liquid crystal on silicon (LCOS) panel and thereby the pixel electrode M23 of the liquid crystal cell 220, which acts as a metal mirror or a reflector, needs to be coupled to the electrode M212 with the pixel voltage Vpix via an electrode M22 made by a second metal layer.

Figure 3A:
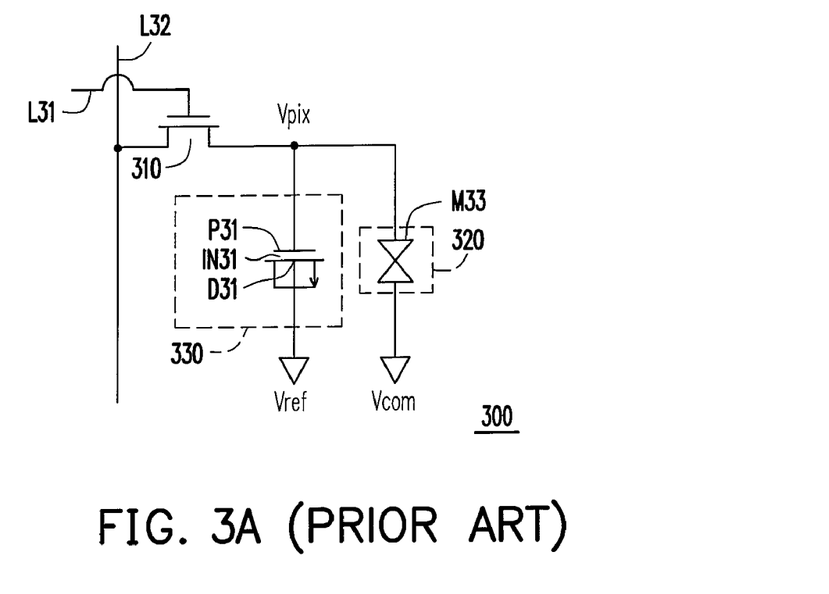
FIG. 3A is a circuit diagram of a pixel device.
Figure 3B:
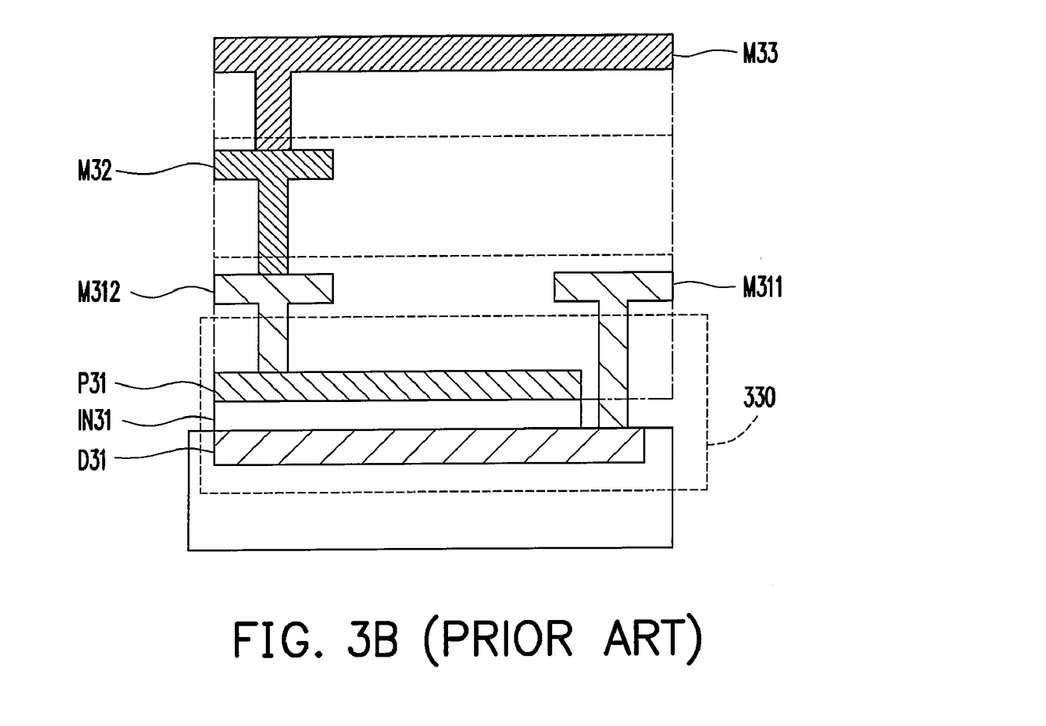
FIG. 3B is a layout structure diagram of the storage capacitor in FIG. 3A.

FIG. 3A is a circuit diagram of another pixel device. Referring to FIG. 3A, the pixel device 300 includes a switch element 310, a liquid crystal cell 320 and a storage capacitor 330 with MOS structure. The connections between the switch element 310, the liquid crystal capacitor 320, and the storage capacitor 330 are the same as FIG. 1. FIG. 3B is a layout structure diagram of the storage capacitor 330 in FIG. 3A. Referring to FIG. 3A and FIG. 3B, the electrodes D31 and P31 of the storage capacitor 330 are respectively made by a diffusion layer and a poly-silicon layer, wherein an insulator IN31 is coupled between the electrodes D31 and P31. Referring to FIG. 3B, the electrode D31 made by the diffusion layer is coupled to an electrode M311 made by a first part of a first metal layer, wherein the reference voltage Vref is provided to the electrode M311. The electrode P31 made by the poly-silicon layer is coupled to an electrode M312 made by a second part of the first metal layer, wherein the pixel voltage Vpix is provided to the electrode M312. Besides, an electrode M33 of the liquid crystal cell 320 is coupled to the electrode M312 with the pixel voltage Vpix via an electrode M32 made by a second metal layer.

Figure 4A:
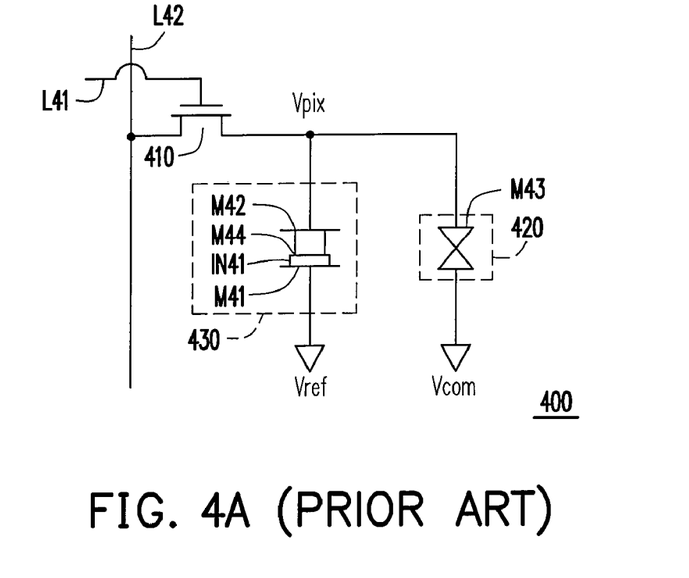
FIG. 4A is a circuit diagram of a pixel device.
Figure 4B:
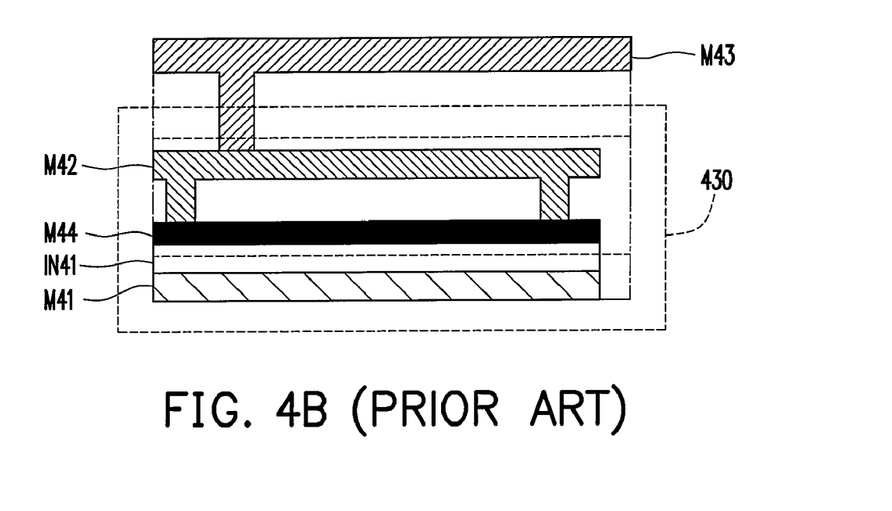
FIG. 4B is a layout structure diagram of the storage capacitor in FIG. 4A.

FIG. 4A is a circuit diagram of another pixel device. Referring to FIG. 4A, the pixel device 400 includes a switch element 410, a liquid crystal cell 420 and a storage capacitor 430 with MIM structure. The connections between the switch element 410, the liquid crystal cell 420, and the storage capacitor 430 are the same as FIG. 1. FIG. 4B is a layout structure diagram of the storage capacitor 430 in FIG. 4A. Referring to FIG. 4A and FIG. 4B, the electrodes M41 and M44 of the storage capacitor 430 are respectively made by a first metal layer and a capacitor top metal (CTM), wherein an insulator IN41 is coupled between the electrodes M41 and M44. The electrode M44 made by CTM is coupled to the electrode M42 made by a second metal layer, wherein the pixel voltage Vpix is provided to the electrode M42 and the reference voltage Vref is provided to the electrode M41. Besides, an electrode M43 of the liquid crystal cell 420 is coupled to the electrode M42 with the pixel voltage Vpix.

In the complementary metal-oxide semiconductor (CMOS) process, the storage capacitors with PIP structure and MOS structure are often used. The said kinds of storage capacitor are layout in the same plane of the transistor taken as the switch element so that the capacitance of the storage capacitor would drastically decrease when the area of the pixel device is decreased. Besides, single structure, such as PIP structure, MOS structure, or MIM structure, is utilized in the said pixel device. Apparently, the space forming the pixel device can not be utilized efficiently. Hence, how to obtain a maximum capacitance of the storage capacitor in the same area of the pixel device or keep the needed capacitance of the storage capacitor in the situation of decreasing the area of the pixel device is an important issue for study and discussion.

SUMMARY OF THE INVENTION

Accordingly, the present invention is a pixel device that can increase the capacitance of pixel device without increasing the area of the pixel device. In addition, the pixel device can keep the needed capacitance when the size of a panel composed of the pixel device is decreased.

A pixel device capable of composing a panel is provided in the present invention. The pixel comprises a first switch, a first capacitor and a second capacitor. The first switch has an input terminal receiving a pixel signal, a control terminal receiving a control signal, and an output terminal selectively delivering the pixel signal to a pixel electrode according to the control signal. The first capacitor has a first part of a first metal layer and a second metal layer, wherein a first dielectric is coupled between the first part of the first metal layer and the second metal layer. The second capacitor has a first poly-silicon layer and an electrode layer, wherein a second dielectric is coupled between the first poly-silicon layer and the electrode layer. The second capacitor is parallel connected to the first capacitor.

In the foregoing pixel device, the electrode layer in one embodiment of the present invention is a second poly-silicon layer.

In the foregoing pixel device, the electrode layer in one embodiment of the present invention is a diffusion layer.

The present invention provides the pixel device that utilizes the layout technique to form parallel connected capacitors within the existed space of the pixel device. Therefore, the pixel device can increase the capacitance without increasing the area of the pixels device. The pixel device can be applied to compose a panel and keep the needed capacitance when the panel size is decreased.

In order to make the features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 5A:
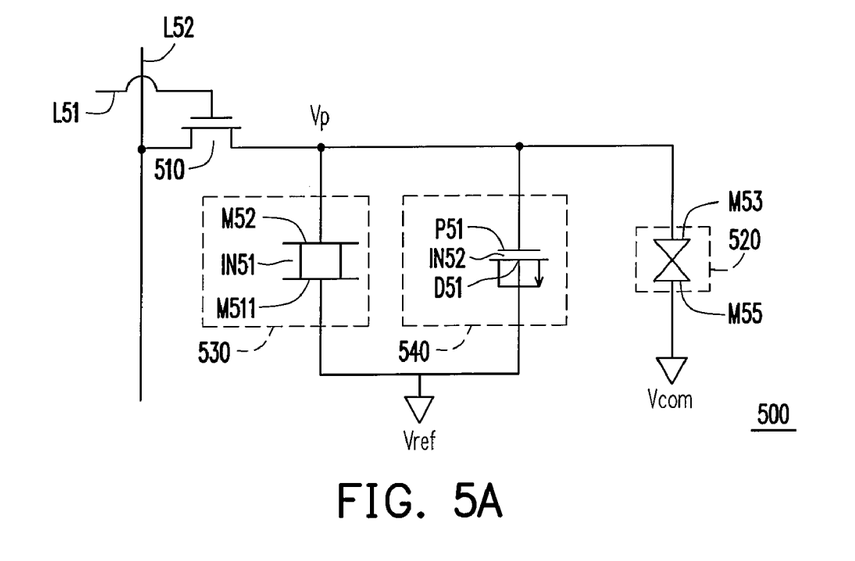
FIG. 5A is a circuit diagram of a pixel device according to an embodiment of the present invention.

FIG. 5A is a circuit diagram of a pixel device according to an embodiment of the present invention. Referring to FIG. 5A, the pixel device 500 capable of composing a panel includes a switch 510, a liquid crystal cell 520, a capacitor 530, and a capacitor 540. The switch 510, for example, is a transistor or other semiconductor switching device in the embodiment. It is assumed that the panel is a liquid crystal on silicon (LCOS) display panel in the embodiment and a pixel electrode M53 of the liquid crystal cell 520 performs as a metal mirror or a reflector for reflecting the light source. The switch 510 has an input terminal receiving a pixel signal through a data line L52, a control terminal receiving a control signal through a scan line L51, and an output terminal selectively delivering the pixel signal to the pixel electrode M53 of the liquid crystal cell 520. When the control signal is asserted to conduct the switch 510, the pixel signal with a pixel voltage Vp can be transmitted to the pixel electrode M53 of the liquid crystal cell 520 through the data line L52 and the conducted switch 510. The other electrode M55 of the liquid crystal cell 520, for example, an indium tin oxide (ITO) electrode, is coupled to a common voltage Vcom. Therefore, the liquid crystal cell 520 can be responded to the delivered pixel signal to control the liquid crystal rotating.

Besides, the electrodes M52 and M511 of the capacitor 530 are respectively coupled to the pixel electrode M53 of the liquid crystal cell 520 and a reference voltage Vref. The electrodes P51 and D51 of the capacitor 540 are respectively coupled to the pixel electrode M53 of the liquid crystal cell 520 and the reference voltage Vref. The capacitor 540 is parallel connected to the capacitor 530, and the capacitors 530 and 540 are equivalent to a storage capacitor. In the embodiment, the capacitor 530 is metal-insulator-metal (MIM) structure, and the capacitor 540 is metal-oxide-silicon (MOS) structure.

Figure 5B:
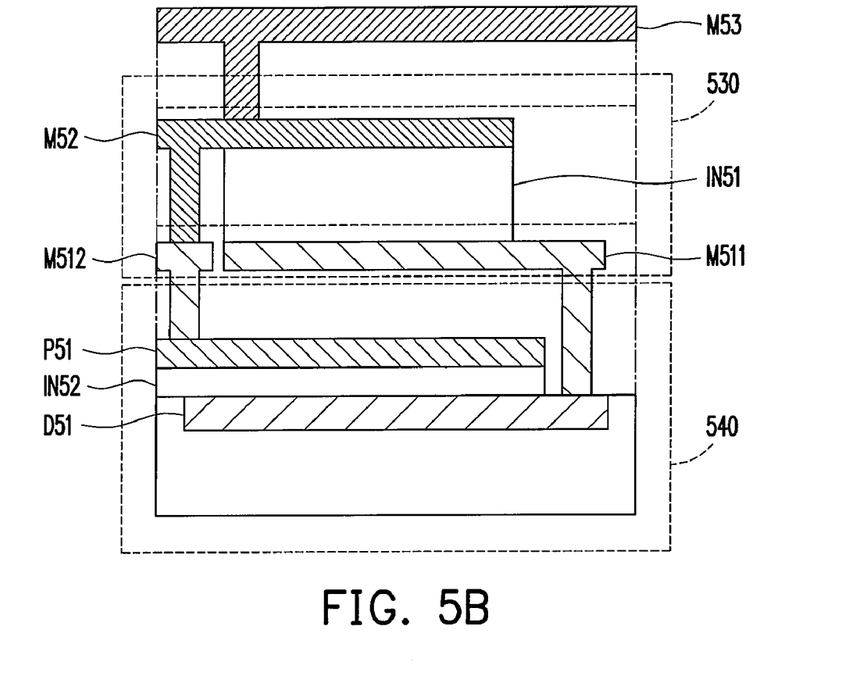
FIG. 5B is a layout structure diagram of the capacitors 530 and 540 according to the embodiment in FIG. 5A.

FIG. 5B is a layout structure diagram of the capacitors 530 and 540 according to the embodiment in FIG. 5A. Referring to FIGS. 5A and 5B, the electrodes M511 and M52 of the capacitor 530 are respectively made by a first part of a first metal layer and a second metal layer, wherein a first dielectric IN51, such as an insulator, is coupled between the electrodes M511 and M52. The electrodes D51 and P51 of the capacitor 540 are respectively made by a diffusion layer and a first poly-silicon layer, wherein a second dielectric IN52, such as an insulator, is coupled between the electrodes D51 and P51.

Referring to FIG. 5B, in the embodiment, the output terminal of the switch 510 is coupled to an electrode M512 made by a second part of the first metal layer by via, and the electrode M512 receives the pixel voltage Vp when the switch 510 is conducted. It is noted that the electrodes M511 and M512 are made by different parts of the first metal layer, and they are not electrically connected together. In order to provide the pixel voltage Vp to the electrode M52 of the capacitor 530 and the electrode P51 of the capacitor 540, the electrode M52 made by the second metal layer is coupled to the electrode M512 made by the second part of the first metal layer by via, and the electrode P51 made by the first poly-silicon is coupled to the electrode M512 by a contact. The pixel electrode M53 is coupled to the electrode M52 made by second metal layer by via for obtaining the pixel voltage Vp. Besides, the reference voltage Vref is provided to the electrode M511 made by the first part of the first metal layer, and the electrode D51 made by the diffusion layer is coupled to the electrode M511 by a contact for obtaining the reference voltage Vref.

The said embodiment utilizes the existed space of the pixel device 500 to form the capacitor 530 with MIM structure. In contrast with the prior art, the parallel connection of the capacitors 530 and 540 brings an increasing capacitance and maintains the plane area of the pixel device 500. If the embodiment of the pixel device 500 is applied to the display panel with small size, e.g. the mobile phone, the pixel device 500 can keep the needed capacitance. Referring to FIG. 5B, since the electrode M511 and the electrode M52 are made by difference metal layers, the distance between the electrode M511 and the electrode M52 may be too long to have enough capacitance. That is the capacitance is inversely proportional to the distance between the two electrodes of the capacitor. In another embodiment of the present invention, a capacitor top metal (CTM) is added for increasing the capacitance.

Figure 5C:
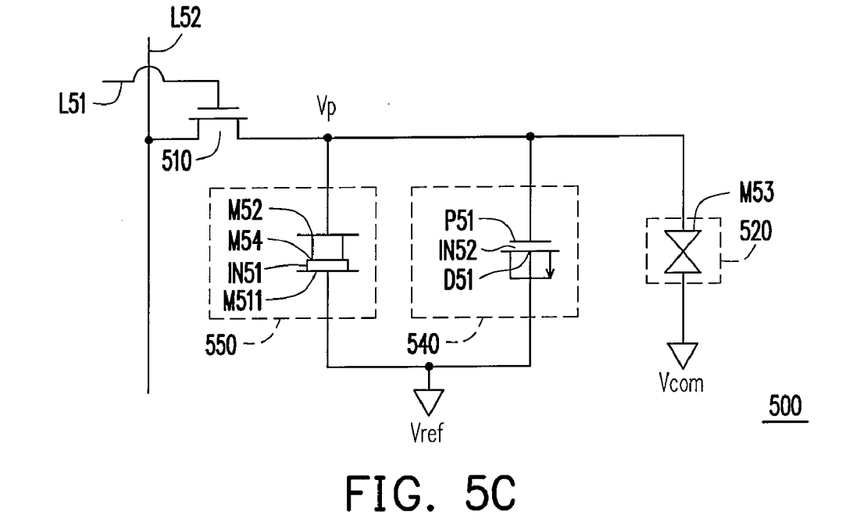
FIG. 5C is a circuit diagram of a pixel device according to an embodiment of the present invention.
Figure 5D:
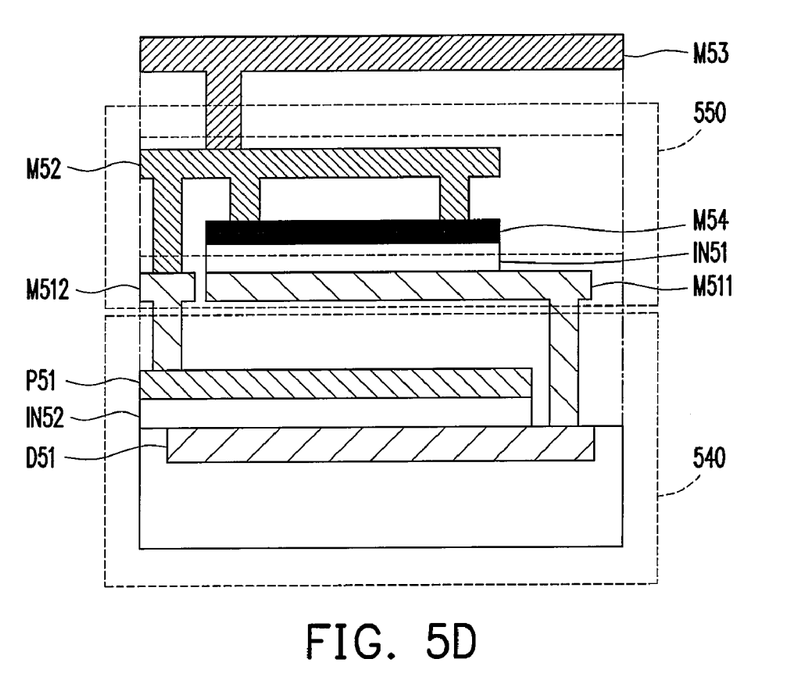
FIG. 5D is a layout structure diagram of the capacitors 550 and 540 according to the embodiment in FIG. 5C.

FIG. 5C is a circuit diagram of a pixel device according to an embodiment of the present invention. Referring to FIG. 5C, the difference between the embodiments of FIG. 5A and FIG. 5C is that an electrode M54 made by CTM is further added on the capacitor 550. FIG. 5D is a layout structure diagram of the capacitor 550 and the capacitor 540 according to the embodiment in FIG. 5C. Referring to 5D, the electrode M54 made by CTM is coupled between the electrode M52 made by the second metal layer and the first dielectric IN51, wherein the electrode M54 is coupled to the electrode M52 by via for obtaining the pixel voltage.

Figure 6A:
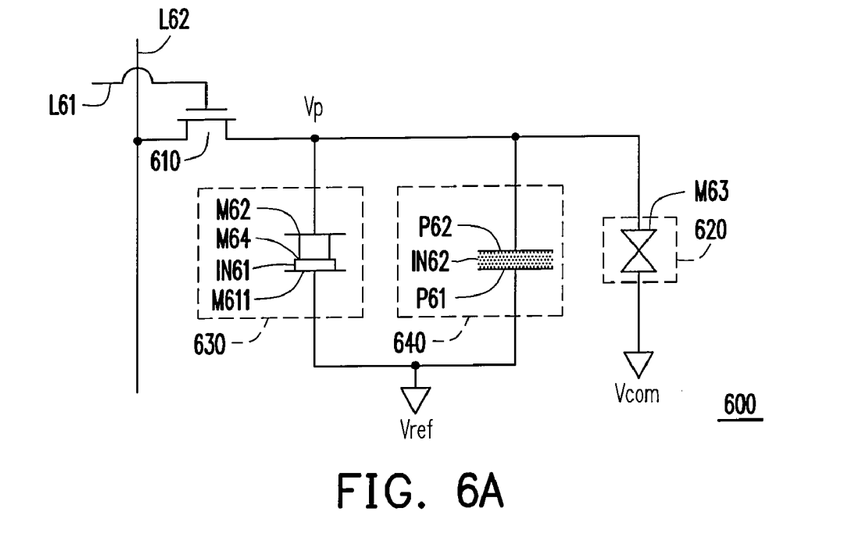
FIG. 6A is a circuit diagram of a pixel device according to another embodiment of the present invention.
Figure 6B:
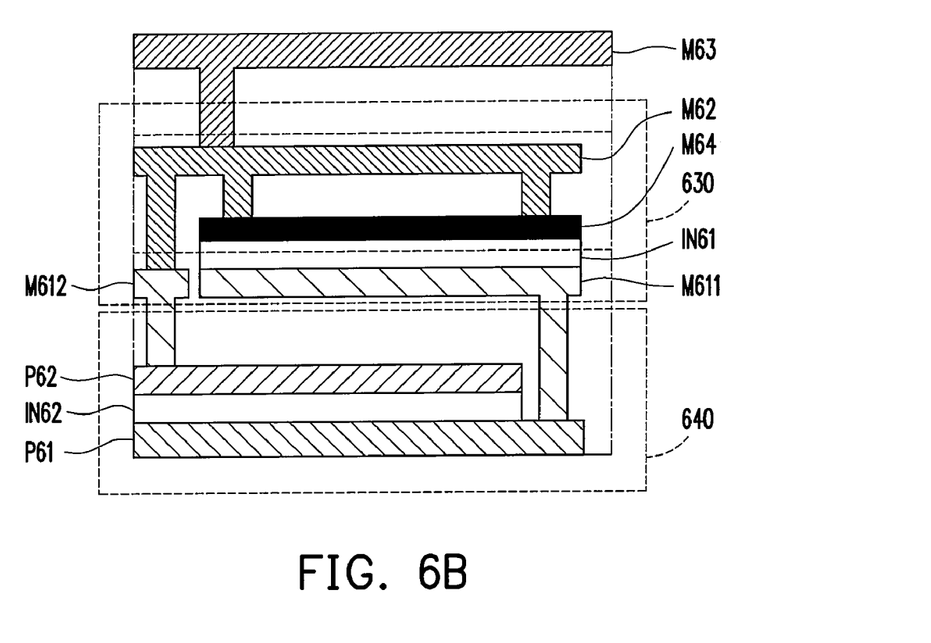
FIG. 6B and FIG. 6C are layout structure diagrams of the capacitors 630 and 640 according to the embodiment in FIG. 6A.

FIG. 6A is a circuit diagram of a pixel device according to another embodiment of the present invention. Referring to FIG. 6A, the pixel device 600 includes a switch 610, a liquid crystal cell 620, a capacitor 630, and a capacitor 640, wherein the capacitor 630 is MIM structure and the capacitor 640 is PIP structure. It is assumed that the pixel device 600 is applied to an LCOS panel in the embodiment so that the pixel electrode M63 of the liquid crystal cell 620 performs as a metal mirror or a reflector. In the embodiment, the switch 610, for example, is implemented by a transistor so that a gate, a first source/drain and a second source/drain are served as the control terminal, the input terminal and the output terminal respectively. People ordinarily skilled in the art can utilize an N-type transistor, an P-type transistor or other semiconductor switching device to implement the switch 610, and the invention is thus not limited to the embodiment. The circuit operation of the pixel device 600 is the same with the pixel device 500 in FIG. 5, and the detail is not to be reiterated herein FIG. 6B is a layout structure diagram of the capacitor 630 and the capacitor 640 according to the embodiment in FIG. 6A. Referring to FIGS. 6A and 6B, the electrodes M611 and M64 of the capacitor 630 are respectively made by a fist part of a first metal layer and a CTM, wherein a first dielectric IN61, such as an insulator, is coupled between the electrodes M611 and M64. Besides, an electrode M62 of the capacitor 630 is made by a second metal layer and the electrode M62 is coupled to the electrode M64 made by the CTM by via for providing the pixel voltage Vp to the electrode M64 (it is described later). The electrodes P61 and P62 of the capacitor 640 are respectively made by a first poly-silicon layer and a second poly-silicon layer, wherein a second dielectric IN62, such as an insulator, is coupled between the electrodes P61 and P62.

Referring to FIG. 6B, in the embodiment, the output terminal of the switch 610 is coupled to an electrode M612 made by a second part of the first metal layer so that the electrode M612 receives the pixel voltage Vp when the switch 610 is conducted. It is noted that the electrodes M612 and M611 are made by different parts of the first metal layer, and the electrodes M612 and M611 are not electrically connected together. In order to provide the pixel voltage Vp to the electrode M62 of the capacitor 630 and the electrode P62 of the capacitor 640, the electrode M62 made by the second metal layer is coupled to the electrode M612 made by the second part of the first metal-layer by via, and the electrode P62 made by the second poly-silicon layer is coupled to the electrode M612 by a contact. Besides, the pixel electrode M63 is coupled to the electrode M62 made by the second metal layer for obtaining the pixel voltage Vp. The reference voltage Vref is provided to the electrode M611 so that the electrode P61 of the capacitor 640 is coupled to the electrode M611 by a contact for obtaining the reference voltage Vref.

Figure 6C:
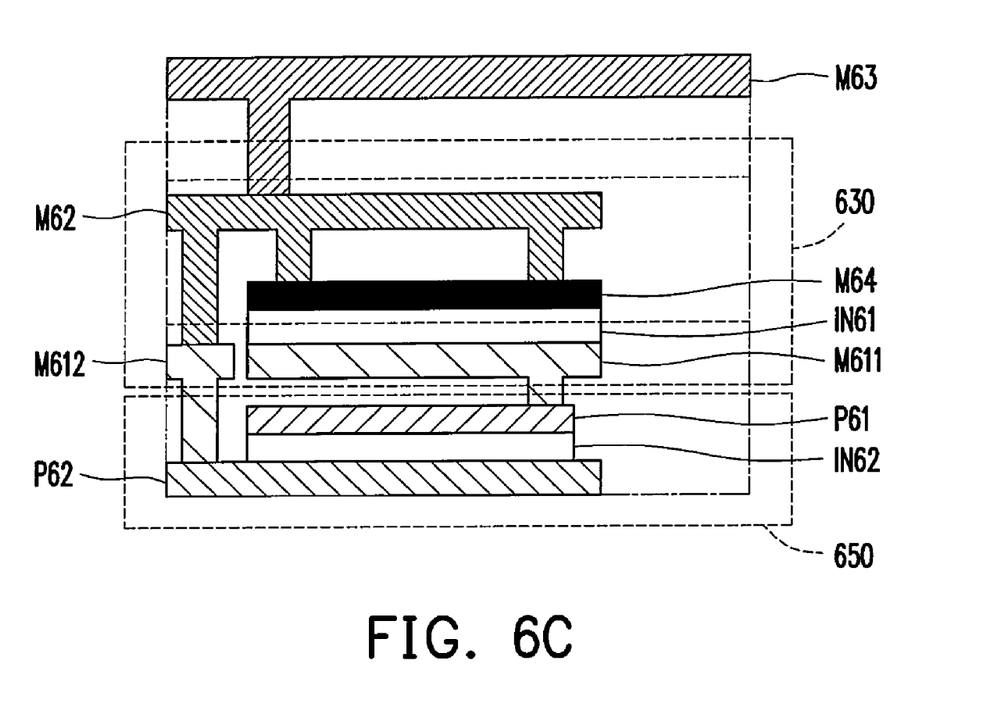

FIG. 6C is another layout structure diagram of the capacitor 630 and the capacitor 650 according to the embodiment in FIG. 6A. Referring to FIG. 6A, FIG. 6B and FIG. 6C, the difference between the embodiments of FIG. 6B and FIG. 6C is that the electrodes P61 and P62 are respectively made by the second poly-silicon layer and the first poly-silicon layer. In order to provide the reference voltage Vref to the electrode P61 made by the second poly-silicon, the electrode P61 is coupled to the electrode M611 made by the first part of the first metal layer by a contact. In addition, in order to provide the pixel voltage Vp to the electrode P62 made by the first poly-silicon, the electrode P62 is coupled to the electrode M612 made by the second part of the first metal layer by a contact.

In the said embodiment of FIG. 6A, FIG. 6B and FIG. 6C, the space for forming the pixel device 600 can be fully utilized by the parallel connection of the capacitor 630 with MIM structure and the capacitor 640 with PIP structure. The said embodiment can keep the capacitance in the situation of limiting layout area, such as fabricating the panel with small size. The following describes another embodiment for making people ordinarily skilled in the art to put the pixel device of the present invention into practice easily according to the teaching of the embodiments.

Figure 7A:
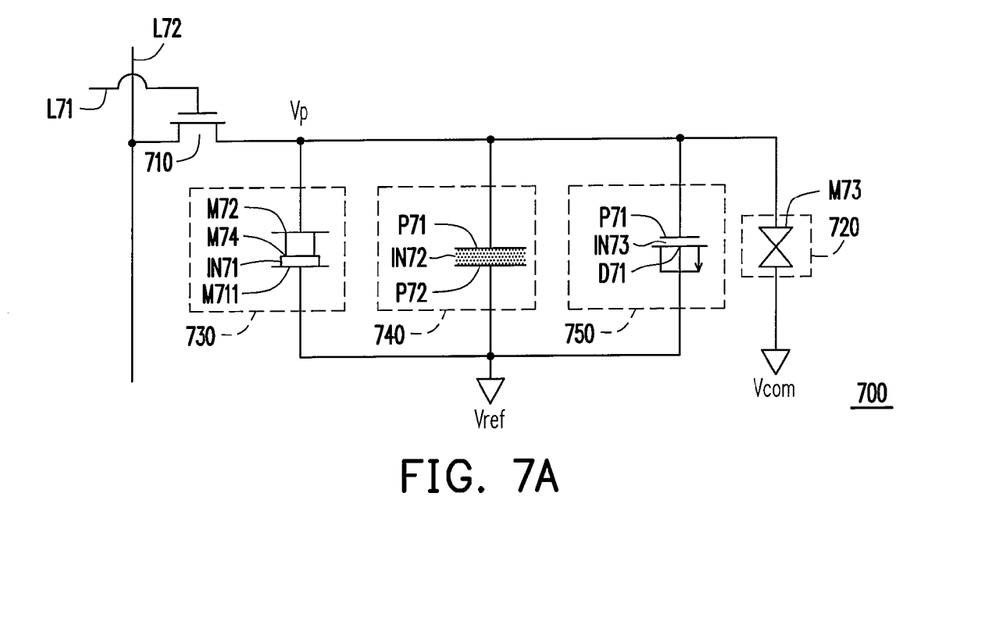
FIG. 7A is a circuit diagram of a pixel device according to another embodiment of the present invention.

FIG. 7A is a circuit diagram of a pixel device according to another embodiment of the present invention. Referring to FIG. 7A, the pixel device 700 includes a switch 710, a liquid crystal cell 720, a capacitor 730, a capacitor 740, and a capacitor 750, wherein the switch 710 is implemented by a transistor in the embodiment. The capacitors 730, 740, and 750 are MIM structure, PIP structure, and MOS structure respectively and they are parallel connected mutually. Especially, the capacitor 740 and the capacitor 750 share the same electrode P71 (it is described later) for saving the space of pixel device. In the embodiment, it is assumed that the panel composed of the pixel device 700 is LCOS panel and the pixel electrode M73 of the liquid crystal cell 720 performs as a metal mirror or a reflector. The circuit operation of the embodiment is the same with the embodiment of FIG. 5, and the detail is not to be reiterated herein.

Figure 7B:
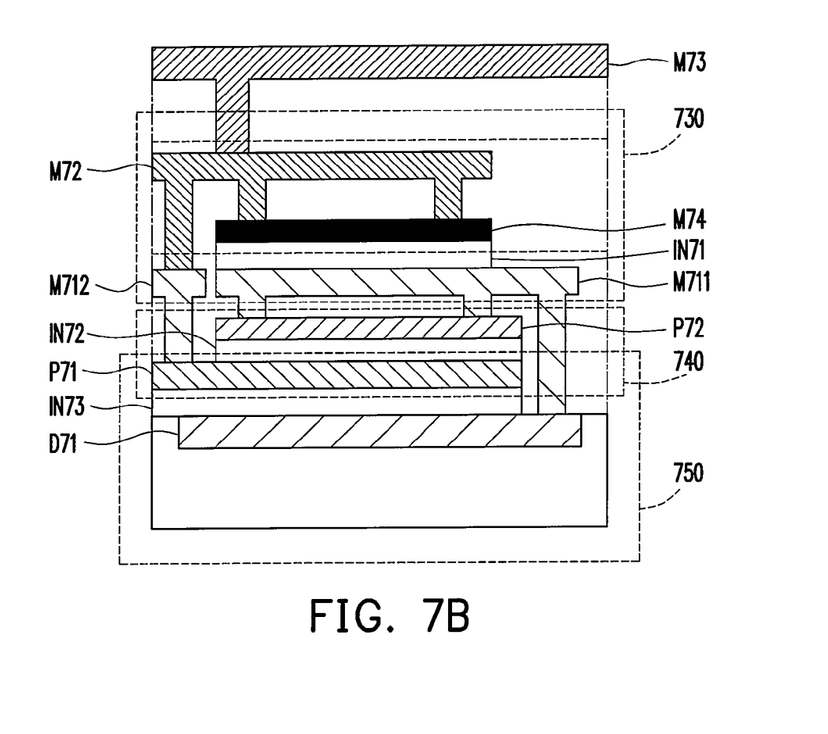
FIG. 7B is a layout structure diagram of the capacitors 730, 740, and 750 according to the embodiment in FIG. 7A.

FIG. 7B is a layout structure diagram of the capacitor 730, the capacitor 740, and the capacitor 750 according to the embodiment in FIG. 7A. Referring to FIGS. 7A and 7B, the electrodes M711 and M74 of the capacitor 730 are respectively made by a first part of a first metal layer and a CTM, wherein a first dielectric IN71, such as an insulator, is coupled between the electrodes M711 and M74. The electrode M72 made by a second metal layer is coupled to the electrode M74 made by the CTM by via for providing the pixel voltage Vp to the electrode M74. The electrode P71 and the electrode P72 of the capacitor 740 are respectively made by a first poly-silicon layer and a second poly-silicon layer, wherein a second dielectric IN72 is coupled between the electrode P71 and the electrode P72. The electrode D71 and the electrode P71 of the capacitor 750 are respectively made by a diffusion layer and the first poly-silicon layer, wherein a third dielectric IN73 is coupled between the electrode D71 and the electrode P71.

Referring to FIG. 7B, in the embodiment, the output terminal of the switch 710 is coupled to an electrode M712 made by a second part of the first metal layer so that the electrode M712 receives the pixel voltage Vp when the switch 710 is conducted. The electrode M72 made by the second metal layer is coupled to the electrode M712 made by the second part of the first metal layer by via, and the electrode P71 made by the first poly-silicon layer is coupled to the electrode M712 by a contact for obtaining the pixel voltage Vp. The reference voltage Vref is provided to the electrode M711 made by the first part of the first metal layer so that the electrode D71 made by the diffusion layer is coupled to the electrode M711 by a contact for obtaining the reference voltage Vref.

The parallel connection of the capacitors 730, 740, and 750 not only maintains the plane area of the pixel 700, but also fully utilizes the space of forming the pixel device 700 by layout technique for increasing the capacitance. It is noted that although the pixel devices of the said embodiments is applied to compose the LCOS panel, the invention is not limited in that. The pixel devices of the said embodiments can be also applied to other reflective or transmissive liquid crystal display (LCD) panel.

In summary, the said embodiments of pixel device utilize the layout technique to form parallel connected capacitors within the existed space of the pixel device. Not only can fully utilize the space for forming the pixel device, but also increase the capacitance without increasing the area of the pixel device. The said embodiments of pixel device can be applied to compose the panel. Even if the panel size is decreased, the pixel device can keep the needed capacitance.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A pixel device capable of composing a panel, comprising:

a first switch, having an input terminal, a control terminal, and an output terminal, wherein the input terminal receives a pixel signal, and the output terminal selectively delivers the pixel signal to a pixel electrode according to a control signal received by the control terminal;

a first capacitor, having a first part of a first metal layer coupled to a reference voltage, a second metal layer coupled to the pixel electrode, and a first dielectric coupled between the first part of the first metal layer and the second metal layer; and a second capacitor, having a first poly-silicon layer, an electrode layer, and a second dielectric coupled between the first poly-silicon layer and the electrode layer, wherein the second capacitor is parallel connected to the first capacitor, and the electrode layer is a second poly-silicon layer.

2. The pixel device as claimed in claim 1, wherein the first poly-silicon layer is coupled to the second metal layer by a second part of the first metal layer.

3. The pixel device as claimed in claim 2, wherein the second poly-silicon layer is coupled to the first part of the first metal layer by a contact.

4. The pixel device as claimed in claim 1, further comprising:

a third capacitor, having the first poly-silicon layer, a diffusion layer, and a third dielectric coupled between the first poly-silicon layer and the diffusion layer, wherein the third capacitor is parallel connected to the first capacitor.

5. The pixel device as claimed in claim 4, wherein the first poly-silicon layer is coupled to the second metal layer by a second part of the first metal layer.

6. The pixel device as claimed in claim 5, wherein the diffusion layer is coupled to the first part of the first metal layer by a contact.

7. The pixel device as claimed in claim 1, wherein the first capacitor further has a capacitor top metal coupled to the second metal layer by a via and coupled between the second metal layer and the first dielectric.

8. The pixel device as claimed in claim 1, wherein the panel is a liquid crystal display panel.

9. The pixel structure as claimed in claim 1, wherein the panel is a liquid crystal on silicon panel.

* * * * *